March 19, 1940.   F. W. BRIXNER ET AL   2,194,352
CAR CLASSIFICATION SYSTEM FOR RAILROADS
Filed Nov. 25, 1938   6 Sheets-Sheet 4
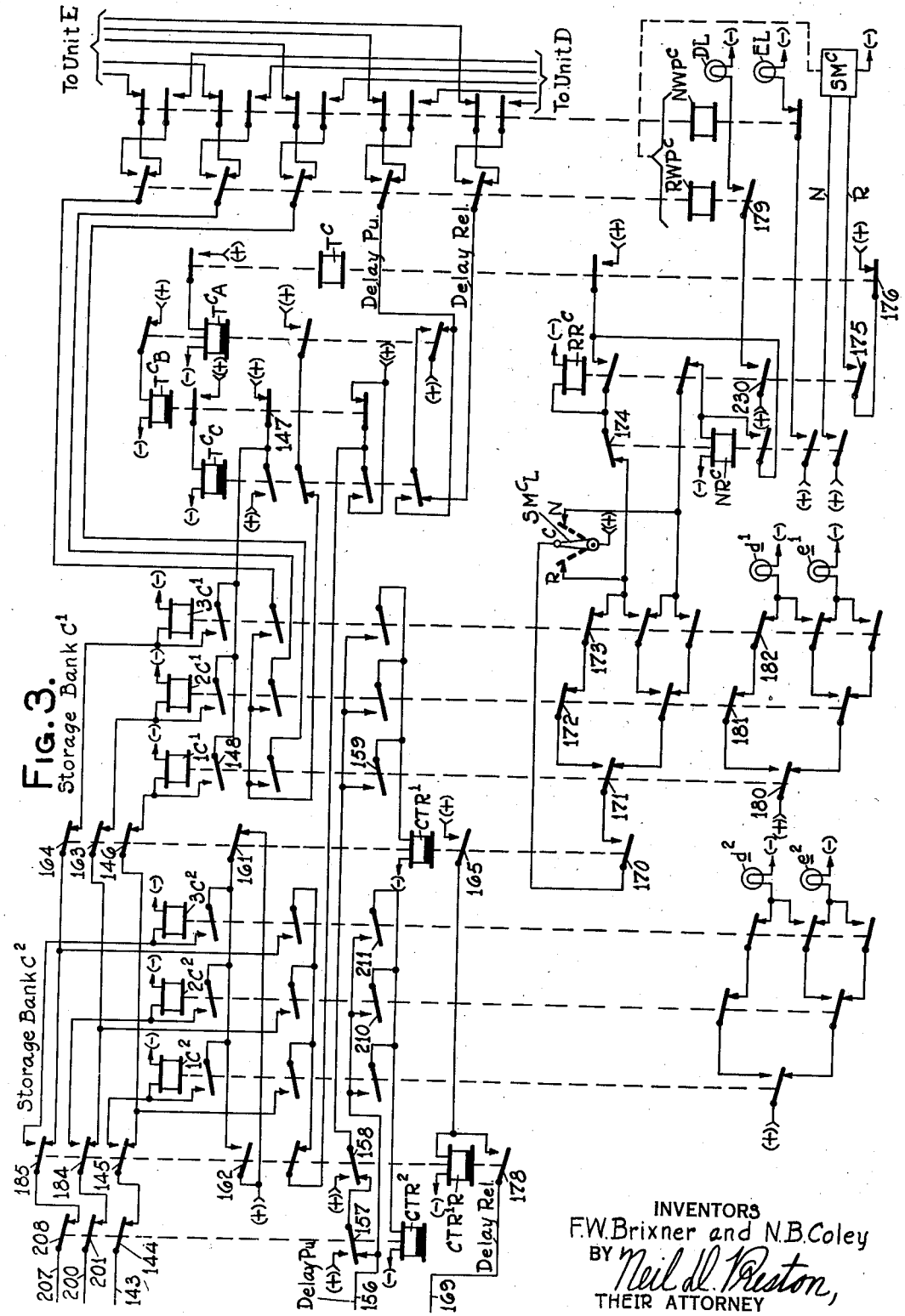
INVENTORS
F.W. Brixner and N.B. Coley
BY Neil A. Preston,
THEIR ATTORNEY

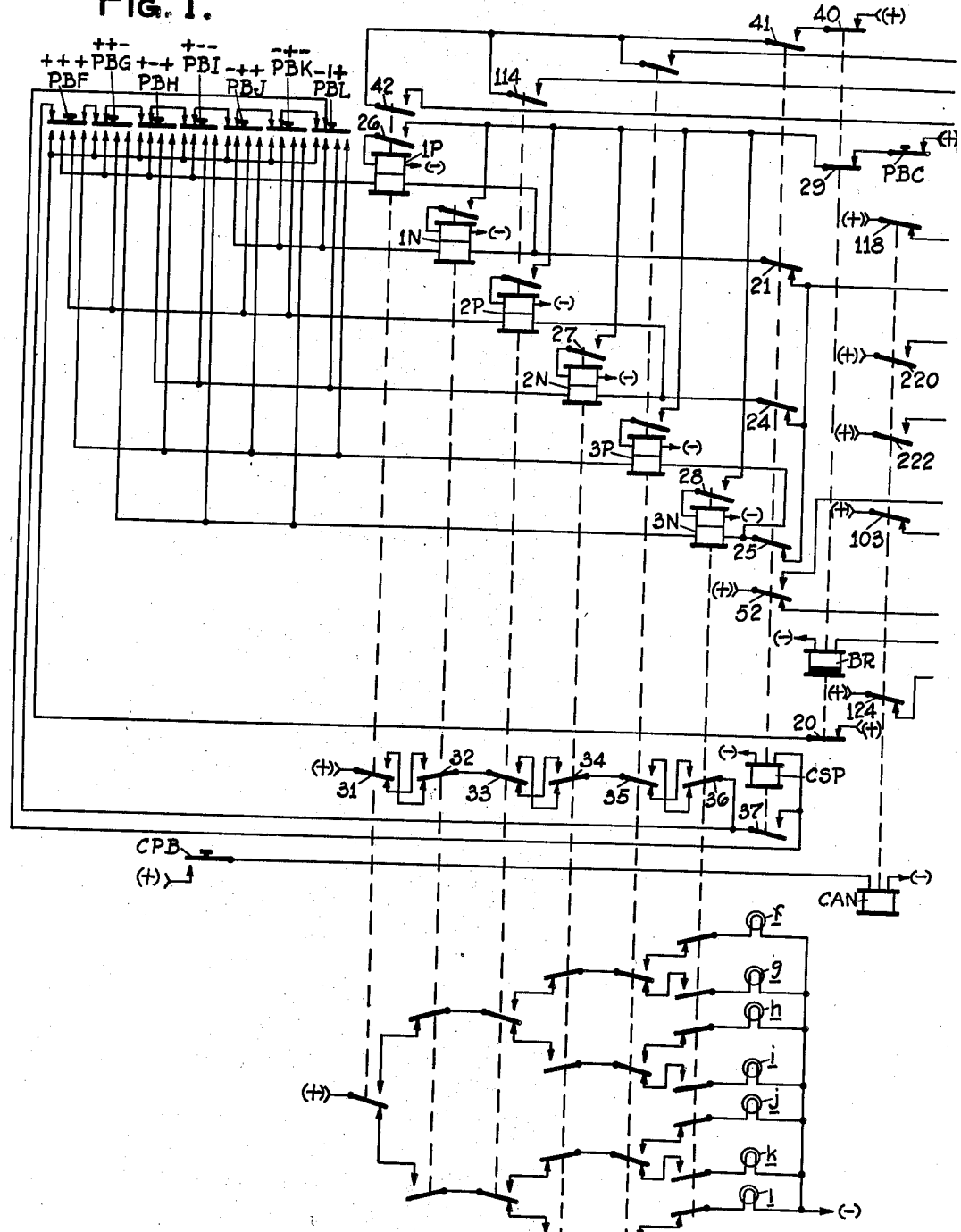

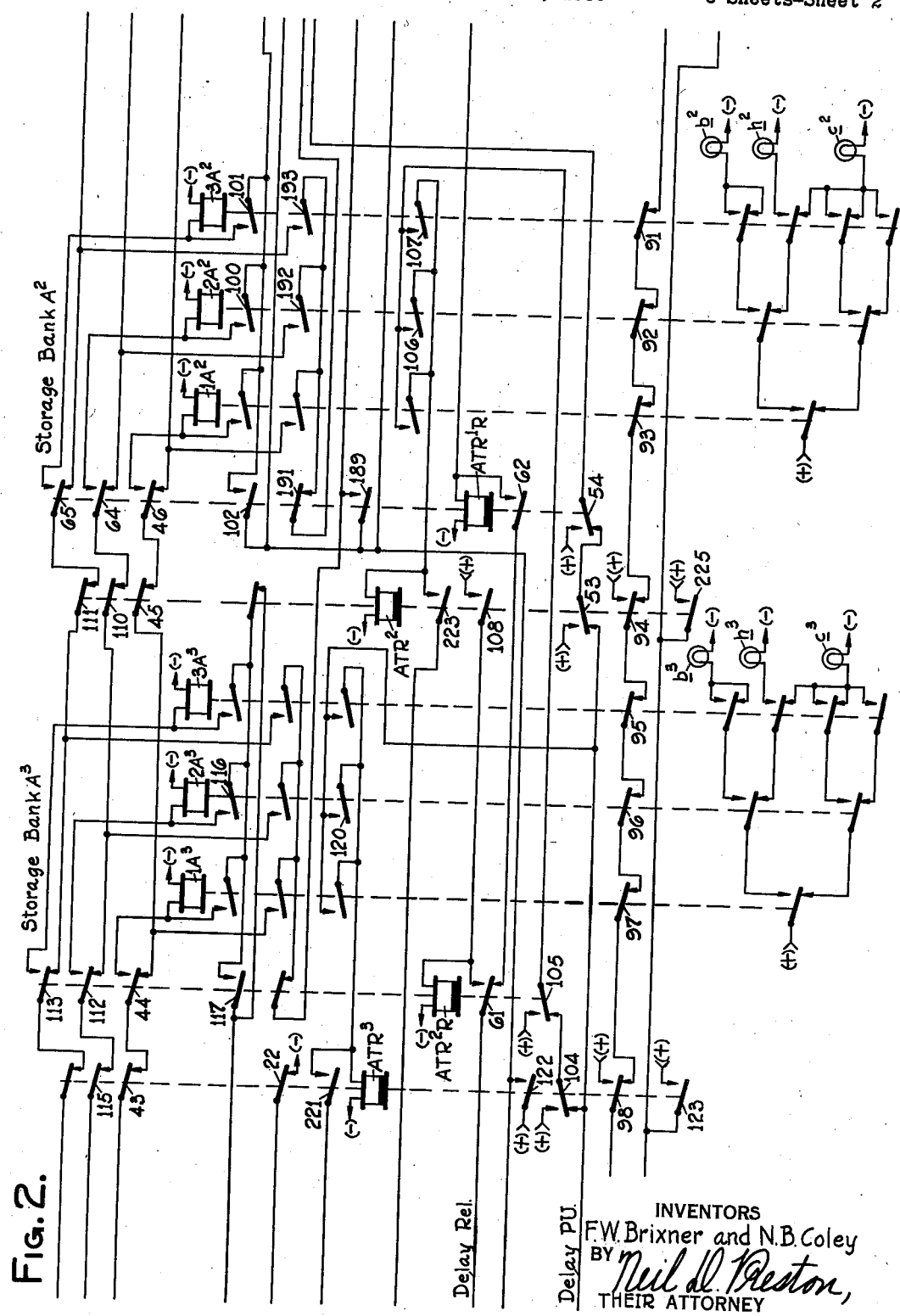

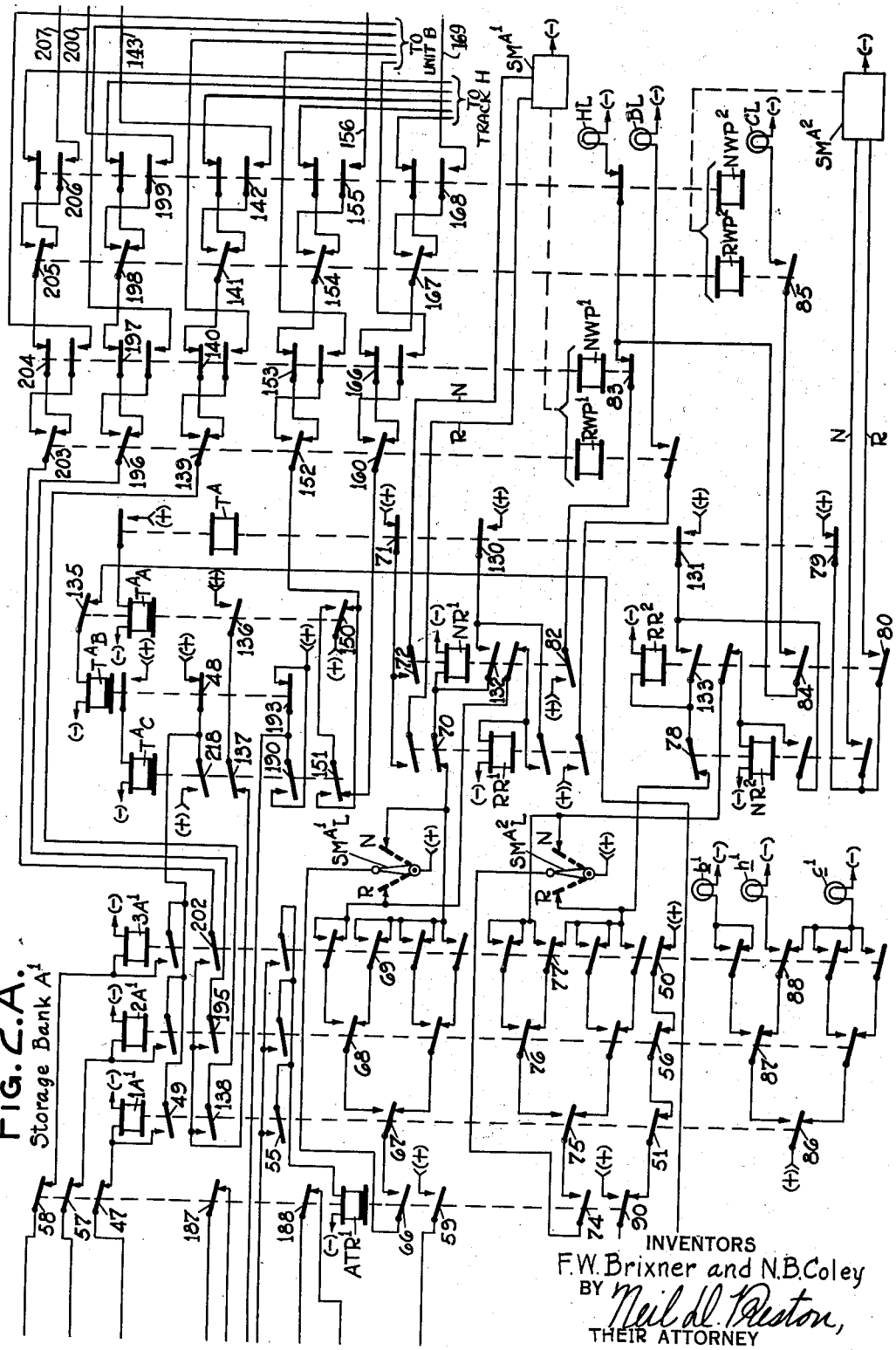

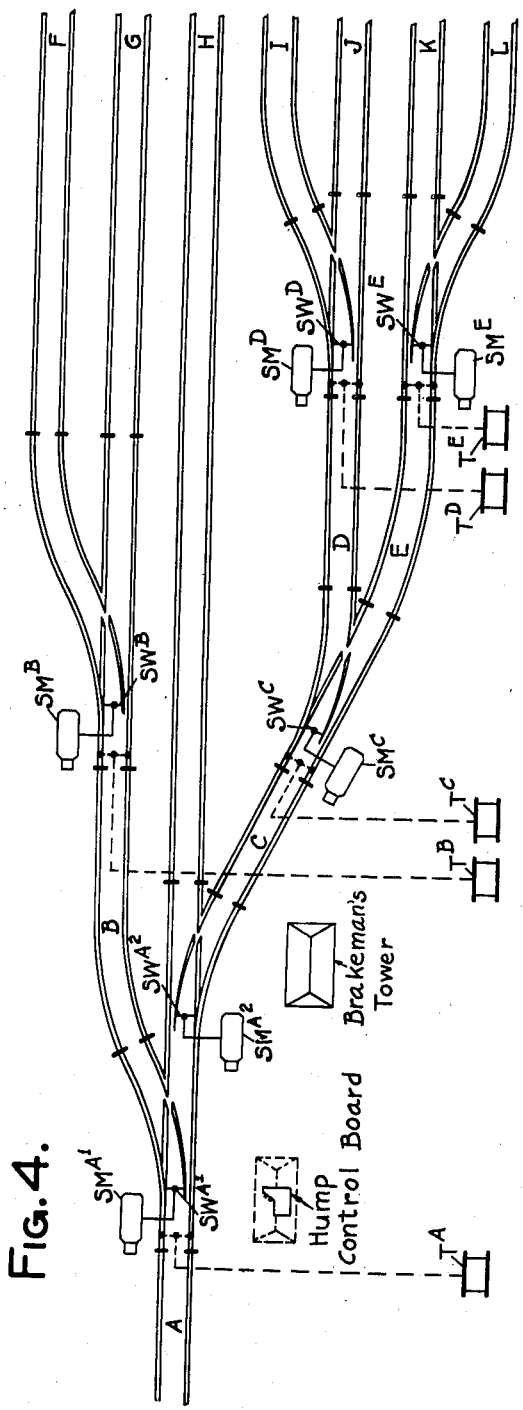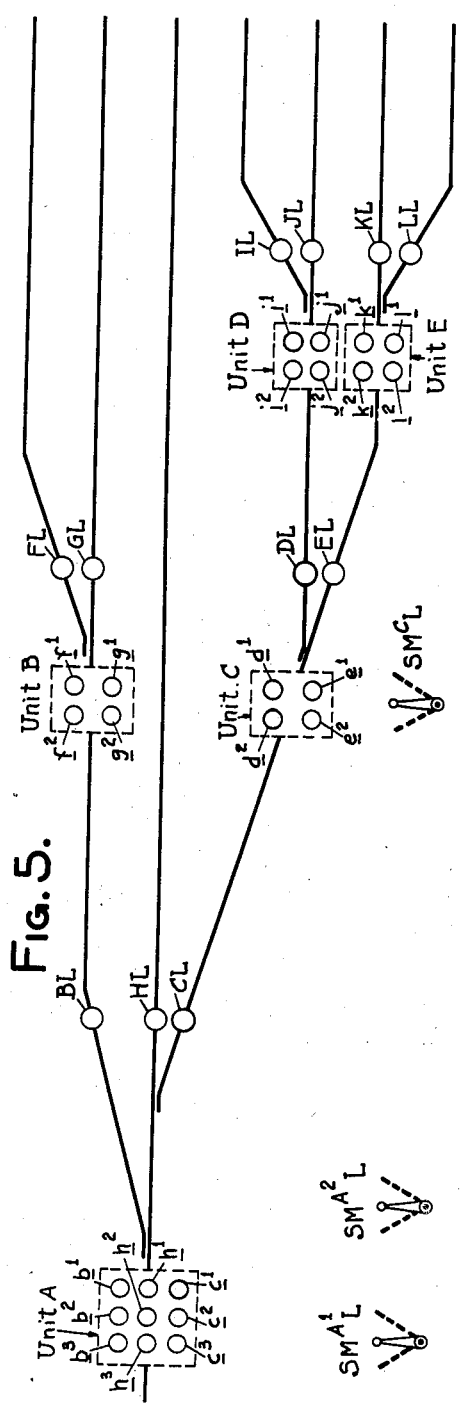

Patented Mar. 19, 1940

2,194,352

UNITED STATES PATENT OFFICE 2,194,352

CAR CLASSIFICATION SYSTEM FOR RAILROADS

Frederick W. Brixner, Gates, and Nelson B. Coley, Rochester, N. Y., assignors to General Railway Signal Company, Rochester, N. Y.

Application November 25, 1938, Serial No. 242,250

24 Claims. (Cl. 246—2)

This invention relates to apparatus for automatically controlling the track switches of a hump-yard system, or the like, and includes train describer apparatus for transmitting a train description or car destination to the successive track switches in a route as the train or car approaches these track switches, each switch being operated before a car reaches it, and is an improvement over the prior application of Robert M. Phinney Ser. No. 111,671, filed November 19, 1936.

A hump-yard classification yard is a yard of tracks and track switches, wherein a single track leading from a hump or hill diverges into a large number of storage tracks through suitable track switches. In practice, cars or trains of cars, or cuts of cars as they are sometimes called, are allowed to run down the hump or hill in close succession, each train or car to a particular storage track. In practice a large number of such cars or trains may follow each other off of the hump in close succession, and in order that a track switch may assume the proper position when a particular car reaches it, it is often necessary that operation of the track switch be started immediately upon vacancy of the detector track circuit associated therewith by the car next in advance. In other words, the requirement of time of operation of track switches is often so precise that automatic control of the track switches is desirable in order that a track switch may be operated just as soon as its detector track circuit becomes unoccupied. Since the cars to be classified may be so closely spaced that several differently classifiable cars may occupy the same stretch of track between two successive track switches, it is necessary to have suitable train describing apparatus which will store, so to speak, the destination a particular car of several cars is to take, so that this stored indication may operate the track switch before the car designated thereby reaches such track switch. In modern hump-yard train classification systems the cars, or cuts of cars, are retarded or braked by suitable track brakes, which track brakes are controlled from a brakeman's tower located below the hump and near the storage tracks of the hump-yard system. The car descriptions stored in the train describer are preferably registered by a man located at the hump control board located on top of a hill or hump where the train to be broken up and classified is located. The brakeman's tower and hump control board have been shown in Fig. 4 of the drawings.

In accordance with the present invention it is proposed to employ a train describer system which employs a plurality of relays in each storage bank and wherein a particular train destination may be stored by the arrangement of energized and deenergized relays in this storage relay bank. That is, the train destination is stored in code fashion, such that seven different train destinations may be stored on three storage relays. It is proposed to employ a plurality of storage relay banks in each storage unit, and to provide suitable means whereby a particular train destination may be transferred from one storage relay bank to another storage relay bank in the same storage unit as soon as the bank indicating the earlier train is vacated, the storage relay bank which represents the first car on the stretch of track belonging to the unit including such bank with the track switch at the exit end of such stretch and to operate the track switch automatically in accordance with the destination which is stored in such first relay bank in that storage unit. It is further proposed to provide suitable means whereby the passage of a train over a track switch, after such track switch has been operated by the first relay group in a storage unit associated therewith, to transfer this stored description or car destination into a storage unit associated with the stretch of track which was selected by the latter track switch, and to cause the next track switch to be controlled by the stored destination when that car passes over said latter track switch, provided of course that there is no car ahead to prevent such operation, and to again transfer the car destination to the particular storage unit associated with the track selected by said next track switch when the car reaches it. It is further proposed to provide suitable means whereby a particular track switch may be operated manually instead of automatically if that is found necessary for any purpose. It is also proposed in accordance with the present invention to provide means for cancelling a train description if this train description to be cancelled has not passed through a point beyond the first track switch encountered in the hump-yard system.

Other objects, purposes and characteristic features of the present invention will in part be obvious from the drawings and will in part be more fully described in the specification.

In the drawings:

Fig. 1 shows the push button unit including a series of push buttons one for each storage track together with a group of push button storage relays, two push button relays for each relay in the storage relay bank of a storage unit, this apparatus preferably being located in the brakeman's tower illustrated in Fig. 4.

Figs. 2 and 2A show the first storage unit containing three storage relay banks together with the necessary apparatus to operate two different track switches, together with the necessary outgoing wire groups to control three different storage units one for each of the three tracks that may be selected by the two track switches.

Fig. 3 shows storage unit C including two banks of storage relays, one bank for storing the first train to reach a switch, and the other for storing the destination of a second train to reach the switch, together with the necessary apparatus for operating the switch machine at that switch and together with the necessary out-going wires to lead to a storage unit for each of the tracks which may be selected by such track switch. Storage units B, C, D and E are substantially identical except for the specific decoding circuits used to control the indicating lamps and the switch machine, and these decoding circuits have been shown in Fig. 6.

Fig. 4 illustrates the actual track layout together with the various track switches, switch machines, and track relays, and together with the hump control board located on top of the hump and the brakeman's tower located near the storage tracks.

Fig. 5 shows a portion of the control and indication panel located in the brakeman's tower, where also is preferably located the apparatus shown in Figs. 2, 2A and 3.

Figure 6:
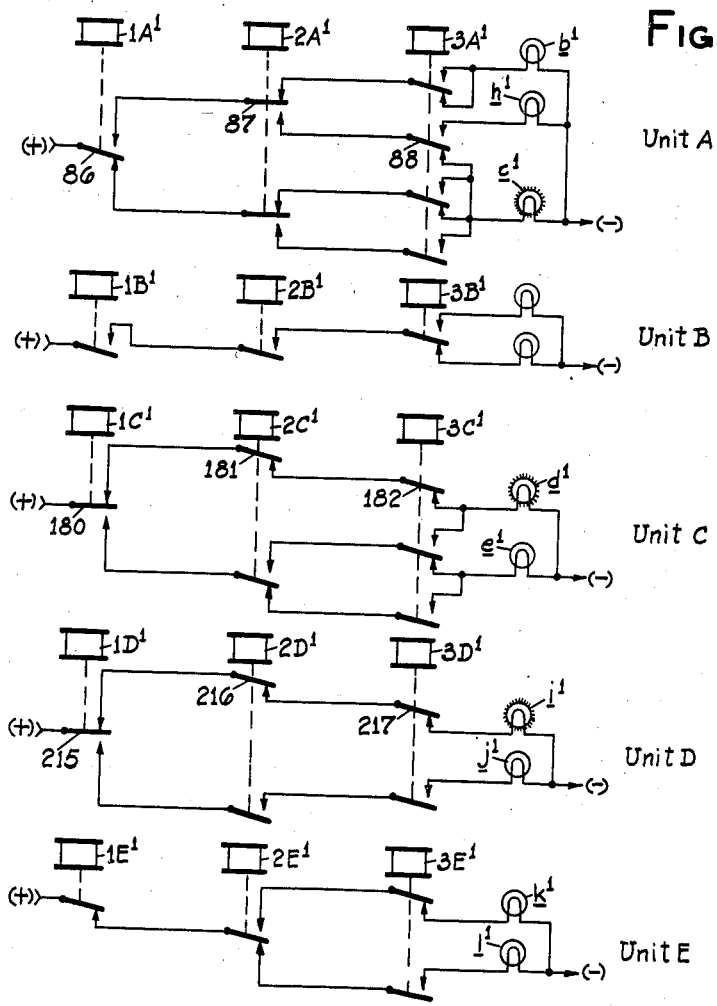

Fig. 6 illustrates the decoding wiring for the lamps for storage units A, B, C, D and E, the wiring for unit A also being shown in Figs. 2 and 2A and the wiring for unit C also being shown in Fig. 3.

Figure 7:
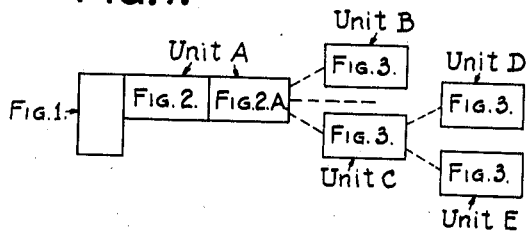

Fig. 7 shows how if Fig. 3 is reproduced, as by making photostat copies thereof and by amending the decoding circuits as shown in Fig. 6, the entire system selected to illustrate the present invention may be built up by connecting the Figs. 1, 2, 2A and 3 together as illustrated in this Fig. 7 of the drawings.

Structure

Referring to Fig. 1 of the drawings the relays P and N having associated therewith prefixes 1, 2 or 3 designate the nature of a code for describing a certain train destination. For instance, if we assume P to mean positive and N to mean negative then the energization of the relays 1P, 2P and 3P would designate a + + + code, whereas with the relays 1N, 2N and 3P energized a code − − + is characterized. By reference to the wiring of Fig. 1 it will be seen that the codes for each of the various push buttons are as follows: for PBF is + + +, PBG is + + −, PBH is + − +, PBI is + − −, PBJ is − + +, PBK is − + −, and for PBL is − − +. These codes have also been indicated over the push buttons. The last letter in each of these push button reference characters designates the storage track illustrated in Fig. 4 to which such push button will send a car. It will be obvious from the drawings that the depression of the first push button PBF will result in the picking up of the relays 1P, 2P and 3P and will result in the illumination of the first indicating lamp $f$, and that in each case the depression of a push button will result in the illumination of a lamp designated by a letter corresponding to the last letter of the push button reference character. Also, these lamps and the storage tracks they represent are located in the same order as are the push buttons. The relay CSP is the delivery or transfer relay and is used for transferring a train description from the push button unit into the first relay bank of the first storage unit A when such destination has been completely set up and the push button, for setting up such destination has been returned to its normal position. The cancelling relay CAN is used for the purpose of cancelling one or more stored train descriptions which descriptions have been stored in the first storage unit illustrated in Figs. 2 and 2A of the drawings.

The blocking relay BR is employed to prevent a new car destination or description being set up in the push button relay group until the previous description has been fully transferred and stored in one of the storage banks in storage unit A, as will be manifested by the picking up of the transfer relay for that bank (relay $ATR^3$ for storage bank $A^3$). The more important function of the relay BR is to cancel the train destination stored in the push button relays, as by opening of its front contact 29, after this train destination has been stored in one of the storage banks. It may be pointed out that Fig. 3 has been shown wired up to constitute unit C and that if Figs. 1, 2 and 3 are connected end-to-end it will show that part of the train classification system involving track switches $SW^{A1}$, $SW^{A2}$ and $SW^C$ illustrated in Fig. 4 of the drawings.

Referring to Figs. 2 and 2A of the drawings, which illustrate storage unit A, comprising three storage banks of relays designated $1A^3$, $2A^3$, $3A^3$; $1A^2$, $2A^2$, $3A^2$; and $1A^1$, $2A^1$, $3A^1$. The prefix in each of these reference characters designates the number of the code relay of a particular bank, the letter A in these reference characters designates that these code relays are associated with the track switches A and form part of storage unit A, and the exponent in each of these reference characters designates the order of the train described in such relay unit. For instance, the relays $1A^1$, $2A^1$ and $3A^1$ designate that the first train to approach one of the track switches A has been stored and is defined in accordance with which of these relays are then energized. The second train to approach the track switch A is stored in the group of code relays $1A^2$, $2A^2$ and $3A^2$; whereas the third train to approach the track switch A is stored in the code relays $1A^3$, $2A^3$ and $3A^3$. The relays $ATR^1$, $ATR^2$ and $ATR^3$ are transfer relays which are used in connection with the transfer of a train description or a train destination from one relay bank into the next relay bank, and the relays $ATR^1R$ and $ATR^2R$ are repeater relays for transfer relays $ATR^1$ and $ATR^2$ respectively, which relays $ATR^1R$ and $ATR^2R$ render the associated storage relay bank effective to receive the next train description.

The relay $T^A$ is a detector track relay for the detector track section associated with the track switches $SW^{A1}$ and $SW^{A2}$, and this track relay is also shown in Fig. 4 of the drawings. This track relay $T^A$ (see Fig. 2A) has associated therewith a track repeater relay $T^{AA}$, a second track repeater relay $T^{AB}$, and a third track repeater relay $T^{AC}$.

As shown in Fig. 4, the detector track circuit containing track relay $T^A$ has associated with it two track switches each provided with a switch machine, these switch machines being designated $SM^{A1}$ and $SM^{A2}$. The control circuits for these switch machines have been illustrated in Fig. 2A of the drawings, the switch machine SM$^{A1}$ being controlled by switch machine control relays NR$^1$ and RR$^1$ and the switch machine SM$^{A2}$ is controlled by control relays NR$^2$ and RR$^2$. Also, the switch machine SM$^{A1}$ controls switch machine repeater relays NWP$^1$ and RWP$^1$, whereas the switch machine SM$^{A2}$ controls switch machine repeater relays NWP$^2$ and RWP$^2$. These switch machines control relays NR$^1$, RR$^1$, NR$^2$ and RR$^2$ and may be controlled automatically through front contacts of the storage relays 1A$^1$, 2A$^1$ and 3A$^1$ or may be controlled manually by switch machine control levers SM$^{A1}$L and SM$^{A2}$L.

The apparatus shown in Fig. 3 of the drawings is identical to that illustrated in Fig. 2 of the drawings except for the omission of certain cancelling features which are performed by the cancel relay CAN shown in Fig. 1 and except for the omission of the control circuit for the blocking relay BR shown in Fig. 1 of the drawings. The control circuits for the switch machine shown in Fig. 3 are of course somewhat different from the circuits shown in Fig. 2 because the switch machine shown in Fig. 3 must at times assume a different position than does one or the other of the switch machines shown in Fig. 2 for the same code.

As heretofore pointed out, referring to Fig. 1, the circuits for the indicating lamps $f$, $g$, $h$, $i$, $j$, $k$, $l$, when all of the contacts of the N relays are disregarded, they being checking contacts, are characteristic of the seven codes set up by push buttons PBF, PBG, PBH, PBI, PBJ, PBK and PBL, respectively. In other words, the circuits for these lamps $f$ to $l$, inclusive, characterize the seven codes of the system illustrated. Referring now to Fig. 4 it will be noted that the switch SW$^{A1}$ must be operated to its reverse position for the first two routes to storage tracks F and G and for the first two codes + + + and + + − and should be operated to its normal position for the remaining five codes, and referring to the contacts associated with relays 1A$^1$, 2A$^1$ and 3A$^1$ (see Fig. 2A) it will be noted that similar circuits associated with these relays are such that the circuit portion characteristic of the first two codes completes a pick-up circuit for the switch machine control relay RR$^1$ and that the circuits reflecting the remaining five codes close a pick-up circuit for the switch machine control relay NR$^1$. Also, referring to Fig. 4, it will be noted that the track switch SW$^{A2}$ must assume its normal position for the first three codes and must assume its reverse position for the last four codes, accordingly, the circuit portions reflecting the first three codes and associated with the relays 1A$^1$, 2A$^1$ and 3A$^1$ (see Fig. 2A) are characteristic of the first three codes for the lamps $f$, $g$ and $h$ of Fig. 1 and close a pick-up circuit for the relay NR$^2$; whereas the circuit portions characteristic of the last four codes close a pick-up circuit for the relay RR$^2$. Furthermore, referring again to Fig. 4, it will be noted that the switches SW$^{A1}$ and SW$^{A2}$ select one of the three branch tracks B, H and C, and that codes 1 and 2 must select the branch B, code 3 must select the branch H, and codes 4, 5, 6 and 7 must select the branch C, and accordingly, the indicating lamp $b^1$ is lighted when either of codes 1 or 2 is set up in the relays 1A$^1$, 2A$^1$ and 3A$^1$, that lamp $h^1$ is lighted if the third code is set up in these relays and that lamp $c^1$ is lighted if any one of the last four codes is set up in this relay bank A$^1$.

Referring again to Fig. 4 and particularly to switch SW$^C$, it will be noted that this switch SW$^C$ should remain in its normal position for the sixth and seventh code and should be operated to its reverse position for the fourth and fifth code, and referring to the contacts associated with code relays 1C$^1$, 2C$^1$ and 3C$^1$ (see Fig. 3) it will be noted that the relay NR$^C$ is picked up if either the sixth or seventh code has been set up in this relay bank and that the switch machine control relay RR$^C$ is picked up if either the fourth or fifth code is set up in this relay bank.

Referring to Figs. 2 and 2A in addition to the indication lamps $b$, $h$, $c$ containing suitable exponents corresponding to the relay bank and associated with storage unit A, there are also provided indicating lamps BL, HL and CL. These latter indicating lamps indicate how the track switches SW$^{A1}$ and SW$^{A2}$ are positioned in correspondence with their control relays and show the fact that these control relays are energized. These indicating lamps BL, HL and CL are shown on the miniature track diagram illustrated in Fig. 5 in the miniature tracks connecting unit A with unit B, the middle track H, and unit C, respectively. The lamps indicating the trains actually stored in the three storage relay banks and designated $b^1$, $h^1$, $c^1$; $b^2$, $h^2$, $c^2$ and $b^3$, $h^3$ and $c^3$ are also located on this miniature track diagram and are shown associated with unit A of this diagram. In a similar manner, indicating lamps DL and EL illustrating the position of the track switch SW$^C$ in correspondence with its control relays are shown in the miniature rails emanating from miniature track switch SW$^C$ in Fig. 5 and the indicating lamps $d^1$, $e^1$, $d^2$ and $e^2$ indicate the destination of two trains which may be stored in the two relay banks C$^1$ and C$^2$ of storage unit C. In a similar manner, the indicating lamps for storage unit D and unit E have been illustrated in Fig. 5 of the drawings, and the control circuits for these lamps have been shown in Fig. 6.

Each of the switch machines SM, having an exponent A, B, C, D or E, has associated with it a detector track relay T, having a corresponding exponent. These detector track relays have been illustrated in Fig. 4, and of these track relays the rack relays T$^A$ and T$^C$ have been shown in Figs. 2A and 3, respectively. If Fig. 3 were reproduced photostatically to represent unit B, unit D or unit E, these track relays would be designated T$^B$, T$^D$ and T$^E$, respectively, and in a similar manner such reproductions of Fig. 3, when used to constitute unit B, unit D or unit E of Fig. 5, would have the letters C designating the unit of Fig. 3 changed to B, D or E, as the case may require. Similarly, the other reference characters would have to be changed by substituting the proper letter for the letter C in Fig. 3. Also, the circuits for the indicating lamps and switch machines would have to be changed to conform to Fig. 6.

*Operation*

Referring to Fig. 4, let us assume that there is a train at the top of the hump and that the hump operator wishes to place the first four cars, or cuts of cars, into storage tracks I, J, K and L in that order, and that he presses the push buttons PBI, PBJ, PBK and PBL in that order as he releases these cars or cuts of cars one after another. The hump operator will therefore first depress the push button PBI, assigned a code of + — —, as a result of which the relays IP, 2N and 3N will be energized. The relay IP will be energized through the following pick-up circuit: beginning at the terminal (+), front contact 20 of the relay BR, contact of the push button PBI, lower winding of the relay IP, back contact 21 of the relay CSP, and back contact 22 of the relay ATR³. The relay 2N will be energized through a similar pick-up circuit but including the back contact 24 of the relay CSP instead of the back contact 21, and the relay 3N will be picked up through a similar pick-up circuit with the exception that it includes a back contact 25 of the relay CSP. Relays IP, 2N and 3N will then remain stuck up through stick circuits including their stick contacts 26, 27 and 28 respectively, and including the front contact 29 of the relay BR. As soon as the push button PBI is released the following pick-up circuit for the relay CSP is closed: beginning at the terminal (+), front contact 31 of the relay IP, back contact 32 of the relay IN, back contact 33 of the relay 2P, front contact 34 of the relay 2N, back contact 35 of the relay 3P, front contact 36 of the relay 3N, back contacts of the push button PBF, PBG, PBH, PBI, PBJ, PBK and PBL in series and the winding of the relay CSP to the terminal (—). With the relay CSP in its attracted position a stick circuit for this relay is closed including its stick contact 37 and the contacts 31 to 36, inclusive, in series. Picking up of the delivery relay CSP breaks the pick-up circuits for all of the relays IP, IN, 2P, 2N, 3P and 3N. Also, picking up of the delivery relay CSP closes the delivery circuit thereby transferring the code stored in these relays P and N to one of the three banks of code relays A¹, A² or A³ contained in the first storage unit A shown in Fig. 2 of the drawings. In other words, if a relay P is energized a corresponding relay in one of the banks of unit A will be energized in such storage bank, but if a relay N is energized the corresponding storage relay in unit A will remain deenergized. In other words, since for the group of relays IP, 2N and 3N there is only one relay P energized, namely, the relay IP, only one of the relays in a storage group will be energized, namely, the first storage relay of a bank. In the present instance, since all three of the storage banks of the first storage unit are vacant only the relay IA¹ of the first storage bank is energized, and this relay is picked up through the following pick-up circuit: beginning at the terminal (+), front contact 40 of the relay BR, front contact 41 of the relay CSP, front contact 42 of the relay IP, back contact 43 of the relay ATR³, back contact 44 of the relay ATR²R, back contact 45 of the relay ATR², back contact 46 of the relay ATR¹R, back contact 47 of the relay ATR¹, winding of the relay IA¹ to the other terminal (—). With this relay IA¹ now assuming its energized position the following stick circuit for this relay is closed: beginning at the terminal (+), front contact 48 of the relay TᴬB, and the stick contact 49 of relay IA¹. With the storage code relay IA¹ now picked up the energizing circuit for the relay BR is broken at the back contact 51 of this relay IA¹, the contacts 50 and 56 remaining closed. Dropping of the relay BR opens the stick circuits for the relays IP, 2N and 3N at the front contact 29 of the relay BR.

Dropping of these relays IP, 2N and 3N breaks the stick circuit for the relay CSP at the front contacts 31, 34 and 36 of these relays IP, 2N and 3N, thereby causing the dropping of the relay CSP. With the relay CSP deenergized and its back contact 52 closed an energizing circuit for the relay ATR¹ is closed which may be traced through back contact 52 of relay CSP, back contact 53 of relay ATR², back contact 54 of relay ATR¹R and front contact 55 of the storage code relay IA¹, through the winding of relay ATR¹ to the other terminal (—). Picking up of the transfer relay ATR¹ opens the contacts 47, 57 and 58 included in the transfer wires located between the storage relays of the first and the second bank of relays in the first storage unit A (see Fig. 2), so that a second code cannot be transmitted to the storage relay of bank A¹. Picking up of the transfer relay ATR¹ closes an energizing circuit for the repeater transfer relay ATR¹R including the front contact 59 of the transfer relay ATR¹.

With this repeater transfer relay ATR¹R now energized it is stuck up through a stick circuit including the front contact 52 of the relay CSP, the back contact 61 of the repeater transfer relay ATR²R, and the stick contact 62 of the repeater transfer relay ATR¹R. Also, with the repeater transfer relay ATR¹R energizing the energizing circuit for the transfer relay ATR¹ is transferred from the back contact 54 of relay ATR¹R to the front contact of this relay, receiving energy directly from the (+) terminal of a battery. In this connection it may be pointed out that the relay ATR¹ is sufficiently slow dropping so that it will not drop during the time the contact 54 of the repeater transfer relay ATR¹R is shifted from its back to its front contact to close a direct energizing circuit for relay ATR¹. This direct energizing circuit is really a stick circuit because the contact 54 of relay ATR¹R at times repeats contact 59 of relay ATR¹. The description of the first car has now been stored in the first storage bank A¹, and the transfer relays ATR¹ and ATR¹R are now energized as a result of which the transfer relay ATR¹ holds open the pick-up circuits for the storage relays A¹ at contacts 47, 57 and 58 and the repeater transfer relay ATR¹R at its contacts 46, 64 and 65 connects the pick-up circuit for the storage relays for the relay bank A² to the code bus.

With the first car destination stored in the first storage relay bank A¹ an energizing circuit for the switch machine control relay NR¹ is closed, which may be traced as follows: beginning at the terminal (+), middle contact of a switch machine control lever SMᴬ¹L, front contact 66 of the transfer relay ATR¹, front contact 67 of storage relay IA¹, back contact 68 of storage relay 2A¹, back contact 69 of storage relay 3A¹, back contact 70 of the switch machine control relay RR¹, through the winding of the switch machine control relay NR¹ to the other terminal (—) of the battery. Completion of this circuit will cause energization of the relay NR¹ and will in turn cause the switch machine SMᴬ¹ to be operated to its normal position, if it does not already assume the normal position, through a circuit beginning at the terminal (+) of the battery, through front contact 71 of the detector track relay Tᴬ, front contact 72 of the switch machine control relay NR¹, through the normal circuit of the switch machine, to the terminal (—) of the battery. As soon as the switch machine has responded and the track switch has been fully locked up the normal switch machine repeater relay NWP¹ will be energized.

Also, with the storage relay 1A¹ energized the following circuit for the switch machine control relay RR² will be closed: beginning at the terminal (+), middle contact of the switch machine lever SM^A2L, front contact 74 of the transfer relay ATR¹, front contact 75 of the storage relay 1A¹, back contact 76 of the storage relay 2A¹, back contact 77 of the storage relay 3A¹, back contact 78 of the switch machine control relay NR², through the winding of the switch machine control relay RR² to the other terminal (−) of the battery. With the switch machine control relay RR² energized and with the detector track relay T^A energized the reverse circuit for the switch machine SM^A2 is closed through the following circuit: beginning at the terminal (+), front contact 79 of the relay T^A and front contact 80 of the switch machine control relay RR². The completion of this circuit will operate the switch machine SM^A2 and the track switch SW^A2 to the reverse position, and as soon as operation of the switch machine has started the switch machine indication relay NWP² is deenergized and as soon as the switch has completed its stroke and has been fully locked up the switch machine repeater relay RWP² is energized.

With the switch machine control relays NR¹ and RR² energized and with the switch machine repeater relays NWP¹ and RWP² energized the following energizing circuit for the indicating lamp CL is closed: beginning at the terminal (+), front contact 82 of the relay NR¹, front contact 83 of the relay NWP¹, front contact 84 of the relay RR², and front contact 85 of the relay RWP², thus illuminating the lamp CL. Through similar code reflecting circuits as those employed for controlling the switch control relays NR¹, RR¹, NR² an RR², the indicating lamp c¹ is also energized through a circuit beginning at the terminal (+) of the battery, front contact 86 of the relay 1A¹, back contact 87 of the relay 2A¹ and back contact 88 of the relay 3A¹, thus illuminating this lamp.

The hump tower operator will in the meantime have depressed the push button PBJ to reflect a code − + + and will have caused the energization of the relays 1N, 2P and 3P through pick-up circuits similar to those heretofore traced, in response to which the relay CSP is again picked up and stuck up through its stick circuit. Also, by reason of the energization of the transfer relay ATR¹, as heretofore explained, the relay BR is again energized, but this time through the following circuit: beginning at the terminal (+), through front contact 90 of the transfer relay ATR¹, back contacts 91, 92 and 93 of the storage relays 3A², 2A² and 1A², through back contact 94 of the transfer relay ATR², through back contacts 95, 96 and 97 of storage relays 3A³, 2A³ and 1A³ through back contact 98 of the transfer relay ATR³. As soon as the relay CSP picks up and sticks up, the relay BR being again energized, as just explained, the second code stored in the push button relays P and N, namely, code − + +, is transferred to the second bank of storage relays A² of the storage unit A. Since in this case there are two relays P energized, namely, relays 2P and 3P the storage relays 2A² and 3A² will be energized through pick-up circuits including front contacts 64 and 65 of the repeater transfer relay ATR¹R. As soon as the storage relays 2A² and 3A² are energized the energizing circuit for the blocking relay BR is broken at the back contacts 92 and 91 of these relays. With the storage relays 2A² and 3A² now picked up stick circuits for these relays will be closed including the front contact 100 of relay 2A² and 101 of relay 3A², and also including the front contact 102 of repeater transfer relay ATR¹R and the back contact 103 of the cancelling relay CAN. The dropping of the blocking relay BR will shortly thereafter have dropped the push button storage relays N and P, and will have in turn dropped the delivery relay CSP, as a result of which an energizing circuit for the transfer relay ATR², which may be traced as follows, is closed: beginning at the terminal (+), back contact 52 of the relay CSP, back contact 104 of the transfer relay ATR³, back contact 105 of the repeater transfer relay ATR²R, front contacts 106 and 107 of relays 2A² and 3A³, in multiple, through the winding of the transfer relay ATR² to the terminal (−) of the battery.

The picking up of the transfer relay ATR² results in the closure of an energizing circuit for the repeater transfer relay ATR²R including the front contact 108 of the transfer relay ATR². With the transfer relay ATR² now energized the code storage relays of the bank A² are disconnected from the code bus at the contacts 45, 110 and 111 of the transfer relay ATR², and with the transfer repeater relay ATR²R energized this code bus is connected to the relays of the storage relay of bank A³ through front contacts 44, 112 and 113 of the transfer repeater relay ATR²R. Picking up of the transfer relay ATR² also recloses the energizing circuit for the blocking relay BR at the front contact 94 of this transfer relay. The picking up of transfer repeater relay ATR²R opens the stick circuit of relay ATR¹R and makes this latter relay wholly dependent on its pick-up circuit.

The operator will in the meantime have operated the push button PBK reflecting the code − + − as a result of which the relays 1N, 2P and 3N of the push button storage relays are energized. In response to this energization of the relays 1N, 2P and 3N the delivery relay CCSP is energized to cause this code − + − stored in this push button relay group to be transmitted to the third bank A³ of storage relays. In other words, the energized condition of relay 2P will cause the relay 2A³ to be energized through the following pick-up circuit: beginning at the terminal (+), front contact 40 of the relay BR, front contact 41 of the relay CSP, front contact 114 of the relay 2P, back contact 115 of the transfer relay ATR³, front contact 112 of the transfer repeater relay ATR²R, through the winding of the relay 2A³ to the other terminal (−). With the relay 2A³ energized it will be stuck up through a stick circuit including its stick contact 116, the front contact 117 of repeater transfer relay ATR²R, and back contact 118 of the cancelling relay CAN. Also, with relay 2A³ energized the energizing circuit for the blocking relay BR is broken at the back contact 96 of this relay 2A³. Dropping of the blocking relay BR causes dropping of the push button storage relays 1N, 2P and 3N and will also cause deenergization of the delivery relay CSP. With the relay CSP deenergized and the code storage relay 2A³ energized the following pick-up circuit is closed for the transfer relay ATR³: beginning at the terminal (+), back contact 52 of the relay CSP, front contact 120 of the relay 2A³, through the winding of the transfer ATR³ to the other terminal (—). Picking up of the transfer relay ATR³ prevents the subsequent picking up of any push button storage relays P or N by reason of the opening of the back contact 22 in the pick-up circuit of all P and N relays. Also, the picking up of the transfer relay ATR³ causes its front contacts 122 and 123 to shunt out the back contacts 103 and 124 of the cancelling relay CAN. A train destination stored in the storage bank A³ can still be cancelled by energization of the cancelling relay CAN, but the train destinations stored in storage banks A² and A¹ cannot be cancelled by the cancelling relay CAN.

We now have a car destination or description stored in each of the three storage banks of storage unit A. Let us now assume that the first car which has been cut from the train by the hump board operator has proceeded down the hump and has entered the detector track circuit containing track relay T^A (see Fig. 4), the destination +—— of which car is indicated by the illumination of the indicating lamps C¹ and CL shown in Figs. 6 and 2A of the drawings. Since, as heretofore explained, the track switch SW^A1 has been operated to its normal position and the track SW^A2 has been operated to its reverse position the car is free to move directly into track section C (see Fig. 4). As this car shunts the track relay T^A it will cause deenergization of this track relay T^A (see Figs. 2A and 4), thereby causing the relays NR¹ and RR² to be stuck up through stick circuits including back contacts 130 and 131 of track relay T^A and their respective stick contacts 132 and 133. Also the opening of the front contacts 71 and 79 of this track relay T^A opens both the normal and reverse circuit for each of the switch machines SM^A1 and SM^A2. Also, the dropping of the relay T^A results in the picking up of the normally deenergized track repeater relay T^AA after a short period of delay. This picking up of the relay T^AA causes deenergization of the second track repeater relay T^AB by the opening of back contact 135 of the relay T^AA. Before the second track repeater relay T^AB can open the stick circuits of the storage relays A¹ at contact 48 a code impulse is transmitted through the front contact 136 of track repeater relay T^AA, the back contact 137 of the third repeater relay T^AC through the front contact 138 of the storage relay 1A¹, through the back contact 139 of the switch machine repeater relay RWP¹ through the front contact 140 of the switch machine repeater relay NWP¹, through the front contact 141 of the switch machine repeater relay RWP², through the back contact 142 of the switch machine repeater relay NWP², through wire 143, through back contact 144 of the transfer relay CTR², through the back contact 145 of the repeater transfer relay CTR¹R, through the back contact 146 of the transfer relay CTR¹, through the winding of the code storage relay 1C¹ to the other terminal (—). With this storage relay 1C¹ now energized it will be stuck up through a stick circuit including the front contact 147 of the track repeater relay T^CB and the stick contact 148 of the storage relay 1C¹. With this storage relay 1C¹ now energized a delay pick-up energizing circuit for the transfer relay CTR¹ is closed: beginning at the terminal (+) and continuing either through the front contact 150 of relay T^AA and the front contact 151 of the relay T^AC or through the back contact 150 of the relay T^AA through the back contact 152 of relay RWP¹, front contact 153 of relay NWP¹, front contact 154 of relay RWP², back contact 155 of relay NWP², wire 156, back contact 157 of transfer relay CTR², back contact 158 of transfer repeater relay CTR¹R, front contact 159 of the storage relay 1C¹, through the winding of the transfer relay CTR¹, to the other terminal (—) of the battery. This pick-up circuit will of course not be closed until the track repeater relays T^AA and T^AC have both been picked up due to entrance of the cars or until relay T^AA has dropped due to leaving of the cars. Picking up of the transfer relay CTR¹ by reason of its back contact 161 makes the stick circuits for the code storing relay bank C² dependent upon the front contact 162 of the repeater transfer relay CTR¹R. Also, with the transfer relay CTR¹ energized the code storage relays of storage bank C¹ are disconnected from the code bus by the opening of back contacts 146, 163 and 164 of this relay CTR¹. Also, the picking up of relay CTR¹ energizes the repeater transfer relay CTR¹R through a circuit including the front contact 165 of relay CTR¹. This relay CTR¹R may then be temporarily stuck up through a stick circuit including front contact 150 of relay T^AA, back contact 151 of relay T^AC, back contact 160 of relay RWP¹, front contact 166 of relay NWP¹, front contact 167 of relay RWP², back contact 168 of relay NWP², wire 169, and stick contact 178 of relay CTR¹R. With the relays 1C¹ and CTR¹ energized the following energizing circuit for the switch control relay RR^C is closed: beginning at the terminal (+), middle contact of the switch machine control lever SM^CL, front contact 170 of the transfer relay CTR¹, front contact 171 of the storage relay 1C¹, back contact 172 of the storage relay 2C¹, back contact 173 of the storage relay 3C¹, back contact 174 of the switch machine control relay NR^C, through the winding of the switch machine control relay RR^C to the other terminal (—). With the switch machine control relay RR^C energized the switch machine SM^C is operated through its reverse wire R, and front contact 175 of the relay RR^C and front contact 176 of the detector track relay T^C to its reverse position. As soon as the switch machine SM^C has completed its stroke and has been fully locked up the switch machine repeater relay RWP^C is energized thereby closing an energizing circuit for the lamp DL through front contacts 230 and 179 of relays RR^C and RWP^C, respectively, in series, thus illuminating the lamp DL. Similarly, with the storage relay 1C¹ energized the lamp d¹ associated with this storage bank C¹ is energized through a circuit starting from (+) and including front contact 180 of relay 1C¹, back contact 181 of relay 2C¹ and back contact 182 of relay 3C¹, thus energizing the lamp d¹ as indicated in Figs. 3 and 6 of the drawings.

With the transfer repeater relay CTR¹R picked up stick circuits for the storage relays of bank C² are prepared at front contact 162 of this relay CTR¹. Also, the picking up of this transfer relay CTR¹R connects the storage relays of bank C² to the code bus through front contacts 145, 184 and 185 of the relay CTR¹R.

As the first car or cut of cars enters upon the track circuit containing track relay T^A, as heretofore explained, the dropping of the second track repeater relay T^AB and the picking up of the third track repeater relay T^AC in that order causes momentary opening of the stick circuits for the storage relays A¹. These storage relays therefore assume their retracted positions so the code formerly stored in storage bank $A^1$ has been cancelled and in so dropping deenergize the transfer relay $ATR^1$ so that a new code may be later stored therein. Dropping of the transfer relay $ATR^1$ closes the stick circuits for the relays $2A^2$ and $3A^2$ at back contact 187 of relay $ATR^1$ before it causes opening of the front contact 102 of the repeater transfer relay $ATR^1R$ due to deenergization of this repeater relay by opening of front contact 59. The relays $2A^2$ and $3A^2$ thus remain stuck up through second stick circuits including back contact 187 of relay $ATR^1$. Also, the closing of back contact 188 of transfer relay $ATR^1$ prepares a delivery circuit for delivering a code from storage relays $A^3$ to storage relays $A^2$ at this back contact 188 before a similar delivery circuit is broken at the front contact 189 of the repeater transfer relay $ATR^1R$. As soon as the third track repeater relay $T^AC$ is energized due to the entrance of the train into the track section containing track relay $T^A$ delivery circuits are reclosed at front contact 190 of the track repeater relay $T^AC$ instead of at front contact 193 of relay $T^AB$, which circuits pass from terminal (+) of the battery, through the front contact 190 or 193, through back contact 191 of the repeater transfer relay $ATR^1R$ through two parallel circuit branches one including front contact 192 of relay $2A^2$, back contact 57 of relay $ATR^1$, and winding of storage relay $2A^1$ and the other branch including front contact 193 of the storage relay $3A^2$, the back contact 58 of the transfer relay $ATR^1$ and the winding of storage relay $3A^1$. With the storage relays $2A^1$ and $3A^1$ energized due to code $- + +$ stored therein and with the storage relay $1A^1$ deenergized the indicating lamp $c^1$ is again illuminated, but at this time is illuminated through a different code reflecting circuit than was heretofore the case. In a similar manner as heretofore explained the switch machines $SM^{A1}$ and $SM^{A2}$ are again conditioned for operating their associated switches to the normal and reverse position, respectively, in a manner as heretofore explained, except that the control at this time takes place through different code reflecting circuits than was heretofore the case, but since the first car and the second car are both destined for track section C (see Fig. 4) the switch machines will assume the same positions and the lamps CL and $c^1$ will be illuminated as heretofore, although in each case this control and illumination takes place over different code characterizing circuits. If the second cut of cars passes over the track switches $SW^{A1}$ and $SW^{A2}$ after restoration of the relays $T^A$, $T^AA$, $T^AB$ and $T^AC$ to normal by reason of vacancy of the track circuit by the first car a delivery circuit will be completed by the second picking up of the track repeater relay $T^AA$. This delivery circuit starts from (+), through the front contact 136 of the relay $T^AA$, back contact 137 of the relay $T^AC$ through two circuits in multiple one including front contact 195 of relay $2A^1$, back contact 196 of relay $RWP^1$, front contact 197 of relay $NWP^1$, front contact 198 of relay $RWP^2$, back contact 199 of relay $NWP^2$, wire 200, back contact 201 of transfer relay $CTR^2$, front contact 184 of repeater transfer relay $CTR^1R$, through the winding of relay $2C^2$, and the other branch continuing through front contact 202 of storage relay $3A^1$, back contact 203 of relay $RWP^1$, front contact 204 of relay $NWP^1$, front contact 205 of relay $RWP^2$, back contact 206 of relay $NWP^2$, wire 207, back contact 208 of transfer relay $CTR^2$, front contact 185 of repeater transfer relay $CTR^1R$, through the winding of relay $3C^2$ to the terminal (—). These storage relays $2C^2$ and $3C^2$ will then be stuck up through stick circuits including their own front contact and the contact 162 of the repeater transfer relay $CTR^1R$. Also, the front contacts 210 and 211 of the storage relays $2C^2$ and $3C^2$ in multiple complete an energizing circuit for the transfer relay $CTR^2$, which relay $CTR^2$ upon picking up opens the code bus wires at the back contacts 144, 201 and 208 of this relay and closes an auxiliary circuit for the transfer relay $CTR^1$ at the front contact 157 of this relay $CTR^2$.

Since the two storage banks of the third storage unit shown in Fig. 3 of the drawings are now fully occupied by codes, the lamps $d^1$ and $d^2$ both being illuminated in response to the two storages, no further delivery of a code from the relays bank $A^1$ to the relay bank $C^2$ can take place, until the first stored indication has been passed on to a next storage unit and the storage in the second storage bank $C^2$ has been transferred to the first storage bank $C^1$. This is more particularly true because the back contacts 144, 201 and 208 of the transfer relay $CTR^2$ are open. If the cars are so closely spaced that a third car might enter section C while unit C is filled to capacity an additional storage bank may obviously be added.

In a similar manner as just explained the indication stored in the relay bank $A^3$ consisting of the $- + -$ code resulting in the energization of only the relay $2A^3$ is transferred to the relay bank $A^1$ and results in energization of the storage relay $2A^1$ all in a manner as heretofore explained. In a similar manner depression of the push button PBL by the hump board operator which resulted in the energization of the push button storage relays 1N, 2N and 3P will then result in the energization of the storage relay $3A^2$ of the storage bank $A^2$ in the first storage unit A (see Fig. 2).

In a similar manner as just described, with the track switch $SW^C$ assuming the proper position (reverse), for reasons heretofore given the first car will move into the track section D (see Fig. 4) so that this car may take the proper storage track I or J depending upon the character of the code controlling the switch $SW^D$ by apparatus in storage unit D. In the case as assumed the first car was identified by a code $+ - -$ which resulted from the depression of the push button PBI. This code $+ - -$ would of course result in the energization of the code relay $1D^1$ the contacts of which are shown in Fig. 6 of the drawings adjacent the "unit D" and it will be noted that with the contact 215 of this relay $1D^1$ picked up and with the contacts 216 and 217 of the relays $2D^1$ and $3D^1$ deenergized the indicating lamps $i^1$ will be energized as shown in Fig. 6 of the drawings.

As should appear from the description of operation heretofore given only one train description can be transferred from one storage unit to another storage unit during a single occupancy of the detector track circuit associated with the track switch which separates these storage units. This is clear from the fact that storage relays of bank $A^2$, for instance, cannot deliver a code to storage relays of bank $A^1$ until the relays of bank $A^1$ have dropped, because contacts 47, 57 and 58 in the bus wires are open so long as one of the relays $A^1$ remains energized to maintain transfer relay $ATR^1$ energized. To drop the relays of bank $A^1$ requires the relay $T^AB$ to be down and requires the relay $T^AC$ not yet to have been picked up in response thereto, as is evident from contact 48 of relay $T^AB$ and contact 218 of relay $T^AC$, and when this occurs, namely, the opening of front contact 48, the front contact 133 of this relay is also open and the delivery circuits for delivering a code from the storage relay of bank $A^2$ to the storage relay bank $A^1$, cannot be closed until relay $T^AC$ picks up and closes its contact 190, and since contact 137 opens before contact 190 closes the delivery circuits including this back contact 137 cannot be closed until the track relay $T^A$ has been reenergized and deenergized a second time. In other words, even though a train description may have been transferred from bank $A^2$ to bank $A^1$ while the track circuit containing track relay $T^A$ is still occupied, this new description stored in bank $A^1$ cannot be transferred to unit C until this track circuit becomes occupied a second time, because contact 136 of relay $T^AA$ will be opened before contact 137 of relay $T^AC$ upon clearing of this track circuit. In other words, since the transferring of a code from one storage unit to another is a transient operation accomplished by track relay operations through contacts such as 136 and 137 and since the cancelling of the code from the first storage unit must occur later and is also a transient track relay operation accomplished by such contacts as 48 and 218, a second transfer cannot take place by the same track relay or repeater contacts and consequently a second transfer cannot take place in response to a single track occupancy. Putting this in different words, the transfer from one unit to another takes place only during track occupancy and when the first track repeater relay responds, and cancellation of the code from the first storage relay bank of a unit takes place only upon track occupancy but when the second repeater track relay is actuated, so that only one transfer followed by cancellation can occur during one track occupancy.

Registration cancelling relay

The registration cancelling relay CAN shown in Fig. 1 of the drawings is employed for the purpose of cancelling the last storage of train descriptions that has been stored in one of the three relay banks $A^1$, $A^2$ or $A^3$ contained in storage unit A shown in Fig. 2 of the drawings. In order to get a more clear understanding of this registration cancelling feature let us assume that a train destination has been stored in each one of the storage banks $A^1$, $A^2$ and $A^3$. Under this condition each of the transfer relays $ATR^1$, $ATR^1R$, $ATR^2$, $ATR^2R$ and $ATR^3$ are energized. Depression of the cancelling push button CPB will result in the energization of the cancelling relay CAN. The closure of the front contact 220 of the relay CAN results in the closure of a stick circuit for the transfer relay $ATR^3$ including its stick contact 221. The closure of the front contact 222 of the relay CAN results in the closure of a stick circuit for the transfer relay $ATR^2$ including its stick contact 223. The opening of the back contact 118 of the relay CAN results in the deenergization of one or more, namely, all that are energized, of the storage relays in the storage bank $A^3$ thus cancelling the indication stored therein. The opening of the back contacts 103 and 124 of this cancelling relay CAN does however not result in the cancellation of any further indication, because these back contacts are respectively shunted by contacts 122 and 123 of the stick relay $ATR^3$. The cancelling push button CPB may now be released and in response thereto the opening of its front contact 220 of relay CAN causes deenergization of the stick relay $ATR^3$. The transfer relay $ATR^2$ is however not deenergized even though contact 222 in its stick circuit is opened because the pick-up circuit for that stick relay $ATR^2$ is still closed by reason of front contact 105 of the transfer relay $ATR^2R$ included in series with one or more of the front contacts of the storage relays of bank $A^2$. The train destination stored in storage bank $A^2$ and storage bank $A^1$ are therefore still held in these storage banks. If, however, the operator again depressed the cancelling push button CPB resulting in a second energization of the cancelling relay CAN the stick circuits for the relays of bank $A^2$ will be broken, because the front contact 122 of the relay $ATR^3$ is now open and no longer shunts back contact 103 of relay CAN, as a result of which the train destination stored in storage bank $A^2$ is cancelled. This second picking up of the cancelling relay CAN however again closes the stick circuit for the transfer relay $ATR^2$ at the front contact 222, so that the transfer relay $ATR^2$ remains energized in spite of the dropping of the storage relays of bank $A^2$, and through its front contact 225 shunts back contact 124 of the cancelling relay CAN. If now the cancelling push button CPB is again released and the cancelling relay CAN is again deenergized the opening of its front contact 222 will result in deenergization of the transfer relay $ATR^2$ and since the storage relays $A^2$ have all been deenergized the pick-up circuit for the relay $ATR^2$ is open, this relay $ATR^2$ is deenergized upon the opening of the front contact 222 of the relay CAN. This second energization of the cancelling relay CAN did not cancel the train destination stored in the storage relay bank $A^1$, because the relays $A^1$ are stuck up through a front contact 48 of the track repeater relay $T^AB$, this relay $T^AB$ being held energized through the front contact 225 of the transfer relay $ATR^2$, bearing in mind that relay $ATR^2$ did not drop until after the second deenergization of relay CAN. Upon this second deenergization of the cancelling relay CAN its back contact 124 is again closed before the front contact 225 of relay $ATR^2$ is opened, so that the track repeater relay $T^AB$ is normally maintained energized through this back contact 124. Should, however, the hump board operator desire to cancel the indications stored in the storage bank $A^1$ he may depress the cancelling push button CPB a third time, resulting in a third energization of the cancelling relay CAN. This third energization of the relay CAN through the opening of its back contact 124, the front contacts 123 and 225 of the relays $ATR^3$ and $ATR^2$ now being open, results in the deenergization of the track repeater relay $T^AB$ causing opening of its front contact 48 and deenergization of the storage relays of storage bank $A^1$.

Push button storage cancelling button

The push button PBC is employed to cancel an improper or jumbled code stored in the push button relays P and N. For instance, if the operator were to depress two push buttons, such as PBF and PBG, at the same time he would simultaneously pick up the relays 1P, 2P, 3P and 3N. This is not a true code because the third code element cannot be both positive and negative. Also, under this condition none of the indicating lamps $f$ to $i$ will be lighted. This failure of a lamp to be lighted is due to the fact that the circuit for each lamp $f$ to $i$ includes a front contact of one and a back contact of the other of relays P and N having the same prefix, and since both of these relays in the case assumed are in their energized position all of these circuits are open. The hump tower operator will in this case depress the push button storage relay cancelling push button PBC and will thereby de-energize all of the push button relays P and N by opening all of their stick circuits. In this connection if it is desired to have the code stored in the push button relays to be definitely checked before it is allowed to transfer into one of the storage banks illustrated in Figs. 2 and 2A an executing push button may be added. This executing push button would include a normally open contact, biased open, included in series with the contact 41 of the delivery relay CSP. If such an executing push button is employed the hump board operator would, after first checking the code which he intended to set up by observing whether the proper lamp $f$ to $l$ is lighted, depress the execution push button (not shown).

There are two wires in the system of the present invention which have been designated "Delay P$u$" and "Delay R$el$" meaning delay pick-up and delay release, respectively, of the transfer and repeater transfer relay. For instance, delay is imposed in the picking up of the transfer relay ATR$^1$ after picking up of one or more of the associated storage relays until dropping of relay CSP thereby delaying closure of this pick-up circuit. This feature prevents the train description identifying a particular train from being registered in two adjacent storage banks. Also, the relay ATR$^1$R is slow to release because of the provision of a stick circuit including a front contact 52 of the relay CSP. By this construction positive transfer or delivery action will take place, thus preventing the jumbling up of a code as by the delivery of a second code before a first code has been completely transferred to the storage bank in advance. This delay release circuit is therefore useful to hold the transfer repeater relays stuck up independently of their associated storage relays and to prevent closing of the storage relay bus wires at a point beyond the last occupied storage bank, so that an in-coming description will not register in the wrong bank.

The applicants have thus made a complete disclosure of a hump yard car classification system showing conventionally apparatus capable of automatically operating the track switches and indicating the car destination, for each of a large number of cars or cuts-of-cars proceeding down the hump, and functioning to allow each car to take any one of seven storage tracks. It is of course understood that at the last storage unit the stored indication of a first train stored therein will be cancelled and disappear upon entrance of the car upon the detector track circuit associated with such unit, the cancellation taking place even though this indication is not thereafter stored in a next storage unit, there being no such next storage unit.

Although each of the storage banks illustrated in Figs. 2, 2A and 3 employ a full set of three storage relays there are instances where these relays may be reduced to two. This is apparent from Fig. 6 of the drawings. For instance, since every code that can reach unit B, namely, codes $++$ and $++-$, is such that the first storage relay of the bank is energized in each instance this first relay of each storage relay bank of storage unit B may be entirely omitted. For unit B not both the first and second code relay may however be omitted because an improper indication would then at times be given. Also, since the only codes that can reach storage unit E are codes $-+-$ and $--+$ the first relay of each bank in storage unit E may be omitted.

Having thus shown and described one embodiment of the present invention and having disclosed that embodiment rather specifically it is desired to be understood that the invention is not limited to this particular showing. For instance, instead of having the train descriptions stored in one storage unit capable of selecting any one of two or three tracks and transferring such description to one of two or three storage units, four or five tracks may be selected and the description passed on to a storage unit corresponding to the track selected. Also, if desired, some of the train description lamps illustrated may be omitted and if a more specific indication is desired of the storage track a particular car is to take, this may be indicated instead of merely indicating which track section the next car is to enter as illustrated in the drawings. How these lamps, in order to indicate the storage track, would be connected is obvious since a code identifying circuit for each code has been illustrated for each storage relay bank. In view of the foregoing it is desired to be understood that various additions, omissions and modifications may be made to adapt the invention to the particular problems encountered in practicing the invention without departing from the spirit and scope of the invention except as demanded by the scope of the appended claims.

What we claim as new is:

1. In combination, a car classification system including a track layout having a plurality of routes each starting at an entering track section and terminating in a particular storage track and each route having a plurality of track switches included therein, a train describer unit for each track section leading to points of an associated track switch, each train describer unit comprising a plurality of storage relays which by their condition of energization define the destination of the train stored in such unit, a switch machine for each track switch, switch repeater contacts for each track switch which contacts by their position reflect the position assumed by such switch, means for controlling each switch machine to operate its associated track switch to a position in accordance with the train destination stored in the train describer unit associated with the track section leading to the particular track switch controlled by such switch machine and including circuits each including contacts of at least two storage relays, and transfer circuits for transferring a train destination from the train describer unit associated with the lead track to another train describer unit associated with the track section into which said track switch directs traffic each circuit including some of said switch repeating contacts for that particular track switch and closed only if that particular track switch assumes a position to direct a car to said track section.

2. In combination, a car classification system including a track layout having a plurality of routes each starting at an entering track section and terminating in a particular storage track and each route having a plurality of track switches included therein, a train describer unit for each track section leading to points of an associated track switch, each train describer unit including a plurality of storage relays which by the condition of energization of a plurality thereof in combination define the destination of the train stored in such unit, a switch machine for each track switch, switch repeater contacts for each track switch which by their position reflect the position assumed by such switch, means for controlling each switch machine in accordance with the train destination stored in the train describer unit associated with the track section leading to the particular track switch controlled by such switch machine including a normal and a reverse circuit each including contacts of at least two storage relays, and transfer circuits for transferring a train destination from the train describer unit associated with the lead track to another train describer unit associated with the track section into which said track switch directs traffic from said lead track, each circuit including said switch repeating contacts for that particular track switch which are closed only if said track switch assumes a position to direct traffic from said lead track to said track section.

3. In a car classification system, the combination with a track layout having an entering track and a plurality of storage tracks, each of said storage tracks being connected to said entering track through the medium of a plurality of track switches; of a plurality of train describer units one for each track section leading to a track switch, means for controlling and operating the track switch at the exit end of each section with which a train describer unit is associated by such train describer unit and to a position to conform to the route which is then described in such unit, circuit means including contacts controlled by the switch at the exit end of a section and positioned in accordance with the position assumed by the track switch at the exit end of that section for connecting the said train describer unit for such section to the train describer unit associated with the track section to which said track switch directs traffic, and transfer means for transferring a train description from the train describer unit associated with that section to the train describer unit associated with the selected section next in advance over said circuit means.

4. In a car classification system, the combination with a track layout having an entering track and a plurality of storage tracks, each of said storage tracks being connected to said entering track through the medium of a plurality of track switches; of a plurality of train describer units one for each track section leading to a track switch, means for controlling and operating the track switch at the exit end of each section with which a train describer unit is associated by such train describer unit and to a position to conform to the route set up in such train describer unit, circuit means including contacts controlled by the switch at the exit end of a section and positioned in accordance with the position assumed by the track switch at the exit end of that section for connecting the said train describer unit for such section to the train describer unit associated with the track section to which said track switch directs traffic, and transfer means for transferring a train description from the train describer unit associated with that section to the train describer unit associated with the selected section next in advance, said transfer means also including a circuit portion which is momentarily closed upon occupancy of a track circuit associated with the track switch at the exit end of that section but which is not closed at all during unoccupancy of that track circuit.

5. In combination, a car classification system including a track layout having a plurality of routes each starting at an entering track section and terminating in a particular storage track and each route having a plurality of track switches therein, a train describer unit for each track section leading to points of the associated track switch, each train describer unit having a plurality of storage relays which in combination by their condition of energization define the train destination stored in such unit, a switch machine for each track switch, switch repeater contacts for each track switch which by their position reflect the position assumed by such switch, means for controlling each switch machine in accordance with the train destination stored in the train describer unit associated with the track section leading to the track switch controlled by such switch machine; circuits for transferring a train destination from one train describer unit to another unit associated with the track section into which the track switch controlled by said one train describer unit directs traffic including said switch repeating contacts for the track switch controlled by said one train describer unit; and means for allowing a train destination to be transferred from a particular unit over said circuits only when a train passes over the track switch with which such particular unit is associated.

6. In combination, a car classification system including a track layout having a plurality of routes each starting at an entering track section and terminating in a particular storage track and each route having a plurality of track switches therein, a train describer unit for each track section leading to points of the associated track switch, a detector track circuit associated with each switch, each train describer unit having a plurality of storage relays which in combination by their condition of energization define the destination of the train stored in such unit, a switch machine for each track switch, switch repeater contacts for each track switch which by their position reflect the position assumed by such switch, means for controlling each switch machine in accordance wih the train destination stored in the train describer unit associated with the track section leading to the track switch controlled by such switch machine; circuits for transferring a train destination from one train describer unit to another unit associated with the track section into which the track switch controlled by said one train describer unit directs traffic including said switch repeating contacts for the track switch controlled by said one train describer unit; and means including contacts controlled in accordance with occupancy of the detector track circuit associated with said last mentioned track switch for transferring the stored train destination from said one train describer unit to said another unit.

7. In a train describer system, the combination with a code storage bank including a plurality of storage relays which storage relays in combination reflect the character of a train described therein, a push button unit to control said storage bank, said push button unit including a pair of push button relays for each storage relay, a push button for each train description to be stored in said push button unit or said storage bank and including an executing relay, pick-up circuits for said push button relays so arranged that the depression of any one of said push buttons will energize one relay of each pair of said push button relays, said pick-up circuits including back contacts of said execution relay, stick circuits for said push button relays, an energizing circuit for said execution relay closed only if one and only one of each pair of said push button relays is in its attracted condition, and an energizing circuit for each of said storage relays including a front contact of only one of the relays of a particular pair of push button relays and also including a front contact of said execution relay.

8. In a train describer system, the combination with a code storage bank including a plurality of storage relays which storage relays in combination reflect the character of a train described therein, a push button unit to control said storage bank, said push button unit including a pair of push button relays for each storage relay, a push button for each train description to be stored in said push button unit or said storage bank and including an executing relay, pick-up circuits for said push button relays so arranged that the depression of any one of said push buttons will energize one relay of each pair of said push button relays, said pick-up circuits including back contacts of said execution relay, stick circuits for said push button relays, an energizing circuit for said execution relay closed only if one and only one of each pair of said push button relays is in its attracted condition, an energizing circuit for each of said storage relays including a front contact of only one of the relays of a particular pair of push button relays and also including a front contact of said execution relay, and a manually operable cancelling contact included in said stick circuits.

9. In a train describer system, the combination with a code storage bank including a plurality of storage relays which storage relays in combination reflect the character of a train described therein, a push button unit to control said storage bank, said push button unit including a pair of push button relays for each storage relay, a push button for each train description to be stored in said push button unit or said storage bank and including an executing relay, pick-up circuits for said push button relays so arranged that the depression of any one of said push buttons will energize one relay of each pair of said push button relays, said pick-up circuits including back contacts of said execution relay, stick circuits for said push button relays, a pick-up circuit for said execution relay closed only if one and only one of each pair of said push button relays is in its attracted condition, a stick circuit for said execution relay closed only if all of said push buttons assume their normal released position, and an energizing circuit for each of said storage relays including a front contact of only one of the relays of a particular pair of push button relays and also including a front contact of said execution relay.

10. In a train describer system, the combination with a code storage bank including a plurality of storage relays which storage relays in combination reflect the character of a train described therein, a push button unit to control said storage bank, said push button unit including a pair of push button relays for each storage relay, a push button for each train description to be stored in said push button unit or said storage bank and including an executing relay, pick-up circuits for said push button relays so arranged that the depression of any one of said push buttons will energize one relay of each pair of said push button relays, said pick-up circuits including back contacts of said execution relay, stick circuits for said push button relays, a pick-up circuit for said execution relay closed only if one and only one of each pair of said push button relays is in its attracted condition, a stick circuit for said execution relay closed only if all of said push buttons assume their normal released position, an energizing circuit for each of said storage relays including a front contact of only one of the relays of a particular pair of push button relays and also including a front contact of said execution relay, and a manually operable cancelling contact included in said stick circuits.

11. In a train describer system; the combination with a code storage bank including a plurality of storage relays which storage relays in combination reflect the character of a train described therein; a push button unit to control said storage bank; said push button unit including a pair of push button relays for each storage relay; a push button for each train description to be stored in said push button unit or said storage bank and including an executing relay; pick-up circuits for said push button relays so arranged that the depression of any one of said push buttons will energize one relay of each pair of said push button relays; said pick-up circuits including back contacts of said execution relay, stick circuits for said push button relays, an energizing circuit for said execution relay closed only if one and only one of each pair of said push button relays is in its attracted condition; a transfer relay; an energizing circuit for said transfer relay including in multiple front contacts of each of said storage relays and including in series therewith a back contact of said execution relay; an energizing circuit for each of said storage relays including a front contact of one of the relays of a particular pair of push button relays, a back contact of said transfer relay and also including a front contact of said execution relay.

12. In a train describer system; the combination with a code storage bank including a plurality of storage relays which storage relays in combination reflect the character of a train described therein; a push button unit to control said storage bank; said push button unit including a pair of push button relays for each storage relay; a push button for each train description to be stored in said push button unit or said storage bank and including an executing relay; a transfer relay; pick-up circuits for said push button relays so arranged that the depression of any one of said push buttons will energize one relay of each pair of said push button relays, said pick-up circuits including back contacts of said execution relay and a back contact of said transfer relay, stick circuits for said push button relays, an energizing circuit for said execution relay closed only if one of each pair of said push button relays is in its attracted condition and the other relay of such pair is in its retracted condition; an energizing circuit for said transfer relay including in multiple front contacts of each of said storage relays and including in series therewith a back contact of said execution relay, an energizing circuit for each of said storage relays including a front contact of one of the relays of a particular pair of push button relays, a back contact of said transfer relay and also including a front contact of said execution relay.

13. In a train classification system, the combination with a track layout including an entering track and a plurality of storage tracks, track routes connecting said entering track with each of said storage tracks each route of which includes a plurality of track switches, a train describer unit for each track switch, means associated with each train describer unit for controlling and operating its associated track switch to a position to set up a route portion at that point in accordance with the destination of the train described by such train describer unit, and circuit means associated with some of said train describer units and including the switch repeating contacts of the switch associated with such train describer unit for transferring the train description stored in such train describer unit to the train describer unit associated with the next track switch in advance in such route and selected by the position then assumed by the track switch having said switch repeating contacts associated therewith.

14. In a train classification system, the combination with a track layout including an entering track and a plurality of storage tracks, track routes connecting said entering track with each of said storage tracks each route of which includes a plurality of track switches, a detector track circuit for each track switch, a train describer unit for each track switch, means associated with each train describer unit for controlling and operating its associated track switch to a position to set up a route portion at that point in accordance with the destination of the train described by such train describer, and circuit means associated with some of said train describer units and including switch repeating contacts of the switch associated with such train describer unit and also including contacts controlled in accordance with the condition of occupancy of the detector track circuit associated with the switch having such switch repeater contacts and effective when such detector track circuit controlled contacts are closed for transferring the train description stored in such train describer unit to the train describer unit associated with the track switch next in advance in the route characterized by such train description.

15. In a train classification system, the combination with a track layout including an entering track and a plurality of storage tracks, track rails connecting said entering track with each of said storage tracks by routes each of which includes a plurality of track switches, a train describer unit for each track switch, means associated with each train describer unit for controlling and operating its associated track switch to a position to set up a route portion at that point in accordance with the route for the destination of the train described by such train describer unit, and circuit means associated with some of said train describer units and including track circuit controlled contacts of their associated switches and switch repeating contacts reflecting by their position the position of the switch associated with such train describer unit for transferring the train description stored in such train describer unit to the train describer unit associated with the track switch next in advance in the route characterized by such train description and selected by the position then assumed by the track switch having said switch repeating contacts associated therewith, said last mentioned means including means for permitting only one train description to be transferred for each train passing over such track switch.

16. In a train classification system, the combination with a track layout including an entering track and a plurality of storage tracks, track rails connecting said entering track with each of said storage tracks by routes each of which includes a plurality of track switches, a detector track circuit for each track switch, switch repeating contacts for each track switch, a train describer unit for each track switch, each train describer unit including a plurality of storage relays which in combination by their condition of energization describe a train destination, means associated with each train describer unit for controlling and operating its associated track switch to a position to set up a route portion at that point in accordance with the destination of the train described by the storage relays of such train describer in combination, and means associated with some of said train describer units and including track circuit controlled contacts of the associated detector track circuit including the switch repeating contacts of the switch associated with such train describer unit for transferring the train description stored in such train describer unit to the train describer unit associated with the track switch next in advance in the route selected by the position then assumed by the track switch having said switch repeating contacts associated therewith by energizing the corresponding storage relays of the train describer unit for such switch next in advance, said last mentioned means including means for permitting only one train description to be transferred for each train passing over such track switch.

17. In combination; a train describer unit including a plurality of storage relays which by being energized or deenergized describe the destination of a train; a track switch associated with such train describer unit; a switch machine for operating said track switch; a normal circuit for said switch machine which if closed causes operation of said switch machine to its normal position; a reverse circuit for said switch machine which if closed causes operation of said switch machine to its reverse position; a three-position manually controllable contact which if in one position energizes said normal circuit and which if in a second position energizes said reverse circuit; and means effective when said manually controllable contact is in its third position for closing said normal, said reverse or neither said normal or said reverse circuits depending on the condition of energization of the storage relays of the same train describer unit; whereby the automatic control of said track switch by said train describer unit may be subordinated to manual control.

18. In a train classification system; in combination with a track layout including an entering track and a plurality of storage tracks, said entering track being connected to said storage tracks through routes each route including a plurality of track switches; a detector track circuit for each track switch; switch repeating contacts for each track switch; a train describer unit for each track switch, each unit having a storage bank including a plurality of storage relays; a pick-up circuit for each storage relay including a front contact of the corresponding storage relay of the unit next in the rear, including contacts closed only when the detector track circuit of the track switch with which such unit in the rear is associated is occupied and also including switch repeating contacts for the track switch with which such unit in the rear is associated which are closed only when such switch in the rear directs traffic to the switch with which such unit is associated; a stick circuit for each storage relay including contacts closed when the detector track circuit for the track switch with which such unit is associated is unoccupied; and means associated with each train describer unit for controlling and operating its associated track switch to a position to set up a route portion at that point conforming to the route leading to the destination for the train described in such unit.

19. In a train classification system; the combination with a track layout including an entering track and a plurality of storage tracks, said entering track being connected to said storage tracks through routes, each route including a plurality of track switches; a detector track circuit for each track switch; switch repeating contacts for each track switch which by their contact making condition reflect the position assumed by the track switch; a train describer unit for each track switch, each unit having a plurality of storage banks each bank including a plurality of storage relays; a pick-up circuit for each storage relay for the first bank of each unit including a front contact of the corresponding storage relay of the storage bank next in the rear; a stick circuit for each storage relay of the first storage bank of each storage unit including its own front contacts and also including contacts closed only when the detector track circuit of the track switch with which such unit is associated is unoccupied; a pick-up circuit for each storage relay of the last storage bank of each unit including a front contact of the corresponding storage relay of the first storage bank of the unit next in the rear and also including contacts closed only when the detector track circuit for the track switch with which such unit in the rear is associated is occupied and also including switch repeating contacts for such track switch in the rear closed only if such switch in the rear assumes a position to direct traffic to the track switch with which such unit is associated; a stick circuit for each storage relay for the last storage bank of each unit including a front stick contact of such storage relay and also including contacts which are opened a short time after the storage bank in advance becomes vacated; and means associated with each train describer unit for controlling and operating its associated track switch to a position to set up a route portion at that point constituting a part of the route leading to the destination for the train described in such unit.

20. In combination; a plurality of train describer units, each unit comprising a plurality of storage relays which by being energized or deenergized describe the destination of a train, and a transfer relay having contacts in the input transfer pick-up circuits of said storage relays for allowing or not allowing a train description to be registered in such unit; of a two-position multiple contact switch connecting the out-put transfer wires of one unit to the in-put wires of one or the other of the two other units depending on its position said two-position multiple contact switch by its position indicating the position of a track switch over which said train moves; means including a track relay associated with said track switch and one of said transfer relays for transferring a train destination stored in one of said units to one or the other of the other two of said train describer units depending on the position of said two-position multiple contact switch; and means associated with said one train describer unit for controlling and operating the track switch associated with such unit to a position to set up a route leading to the destination for the train described in such unit and in turn operating said two-position multiple contact switch to a position corresponding to the new position assumed by the track switch.

21. In combination; a track switch connecting a lead section to two diverging track sections; a detector track circuit associated with said track switch; three train describer units each comprising a plurality of storage relays, and a transfer relay one associated with each of said sections; means for controlling and operating said track switch by the train describer unit associated with said lead section to a position to set up a route over said switch in conformity with the train destination stored in said train describer unit; a front contact on each of said storage relays; switch repeater contacts reflecting the position of said track switch; a pick-up circuit for each storage relay of the unit associated with one of said diverging sections including a front contact of the corresponding storage relay of the unit of the lead section, said switch repeater contacts closed when said lead section is connected by said track switch to that diverging section and also including back contacts of the transfer relay of the unit associated with that diverging section; a pick-up circuit for each storage relay of the unit associated with the other of said diverging sections including the same front contact of the corresponding storage relay of the lead section, said switch repeater contacts closed when said lead section is connected by said track switch to the other of said diverging sections and also including back contacts of the transfer relay of the unit associated with the other of said diverging sections; each of said pick-up circuits including contact mechanism closed only momentarily each time said detector track becomes occupied; whereby a train description causes operation of the track switch and is then transferred from one describer unit to another in accordance with the route over which such described train moves.

22. In a train classification system; the combination with a track switch; a train describer unit associated with said track switch and including a plurality of storage relays, said storage relays by their condition of energization characterizing the route identified by the train destination stored therein; means for controlling and operating said track switch in accordance with the route characterized by the train destination stored in said unit; switch repeating contacts for indicating the position assumed by said track switch; a traffic relay which by the condition of energization manifests occupancy of the track circuit associated with said track switch; a first repeater traffic relay controlled by said traffic relay; a second repeater traffic relay controlled by said first repeater traffic relay; stick circuits for said storage relays each including a normally closed contact of said first repeater traffic relay, whereby operation of said first repeater traffic relay will deenergize said storage relays to cancel the train description stored therein; and circuit means including a normally open contact of said traffic relay, a normally closed contact of said second repeater traffic relay and said switch repeating contacts, for when actuated transferring the train description stored in said train describer to a subsequent train describer selected by said switch repeating contacts before said stick circuits are broken.

23. In a train describer controlled switch control system; the combination with a track layout including two successively located track switches; a train describer unit associated with each of said switches, each unit including a plurality of storage relays which by their condition of energization store and describe the destination of a train; a detector track circuit associated with each of said switches including a track relay; a repeater track relay controlled by each track relay; a switch machine for each of said track switches; means controlled by the storage relays of each of said units to control the associated switch machine to a position in conformity with the route to the destination stored in such unit; switch repeating contacts associated with the second of said track switches; a pick-up circuit for each storage relay of the first unit including a front contact of the corresponding storage relay of the second unit, a normally open contact of said track relay and said switch repeating contacts; a stick circuit for each of the storage relays of said second unit each including its own front contact and a normally closed contact of said repeater track relay; whereby the train destination stored in said second unit may be transferred to said first unit before the storage relays of said second unit are dropped by opening of said stick circuits for the storage relays of said second unit and whereby the train destination stored in said second unit will by controlling its associated track switch and the switch repeating contacts associated therewith and controlled thereby determine if the train destination stored therein shall be transferred to said first unit.

24. In combination, a car classification system including a track layout having a plurality of routes each starting at an entering track section and terminating in a particular storage track and each route having a plurality of track switches therein, a train describer unit for each track section leading to points of one or more associated track switches, each train describer unit having a plurality of storage relays which in combination by their condition of energization define the train destination stored in such unit, a switch machine for each track switch, switch repeater contacts for each track switch which by their position reflect the position assumed by such switch, means for controlling each switch machine in accordance with the train destination stored in the train describer unit associated with the track section leading to the track switch controlled by such switch machine; circuits for transferring a train destination from one train describer unit to another unit associated with the track section into which the track switch or switches controlled by said one train describer unit direct traffic including said switch repeating contacts for the track switch or switches controlled by said one train describer unit, and means for allowing a train destination to be transferred from a particular unit over said circuits only when a train passes over the track switch or switches with which such particular unit is associated.

FREDERICK W. BRIXNER.
NELSON B. COLEY.